(12) United States Patent
Czirmer

(10) Patent No.: US 7,036,872 B1
(45) Date of Patent: May 2, 2006

(54) VEHICLE MIDGATE

(75) Inventor: Carlos N. Czirmer, Rochester, MI (US)

(73) Assignee: General Motors Corporation, Detroit, MI (US)

(*) Notice: Subject to any disclaimer, the term of this patent is extended or adjusted under 35 U.S.C. 154(b) by 137 days.

(21) Appl. No.: 10/961,691

(22) Filed: Oct. 8, 2004

(51) Int. Cl.
*B62D 33/06* (2006.01)

(52) U.S. Cl. ............................. 296/190.11; 296/26.11; 296/146.6

(58) Field of Classification Search ............ 296/146.6, 296/26.11, 190.11
See application file for complete search history.

(56) References Cited

U.S. PATENT DOCUMENTS

| 5,223,854 | A | 6/1993 | Shimizu .................... 346/24 |
| 5,333,775 | A | 8/1994 | Bruggemann et al. ...... 228/157 |
| 6,474,725 | B1* | 11/2002 | Sotiroff et al. ......... 296/190.11 |
| 6,513,863 | B1 | 2/2003 | Renke et al. .......... 296/190.11 |
| 6,796,600 | B1* | 9/2004 | Ferer et al. ............. 296/146.1 |

FOREIGN PATENT DOCUMENTS

JP          5286364          * 11/1993

* cited by examiner

*Primary Examiner*—Joseph D. Pape
(74) *Attorney, Agent, or Firm*—Laura C. Hargitt

(57) ABSTRACT

A vehicle midgate includes a generally U-shaped reinforcement member that cooperates with an inner panel and an outer panel to define a cavity for containing a selectively retractable window. The U-shaped reinforcement member has a closed cross section so as to form a channel separate from the cavity. The reinforcement member provides increased stiffness and improved water management inside the midgate.

8 Claims, 3 Drawing Sheets

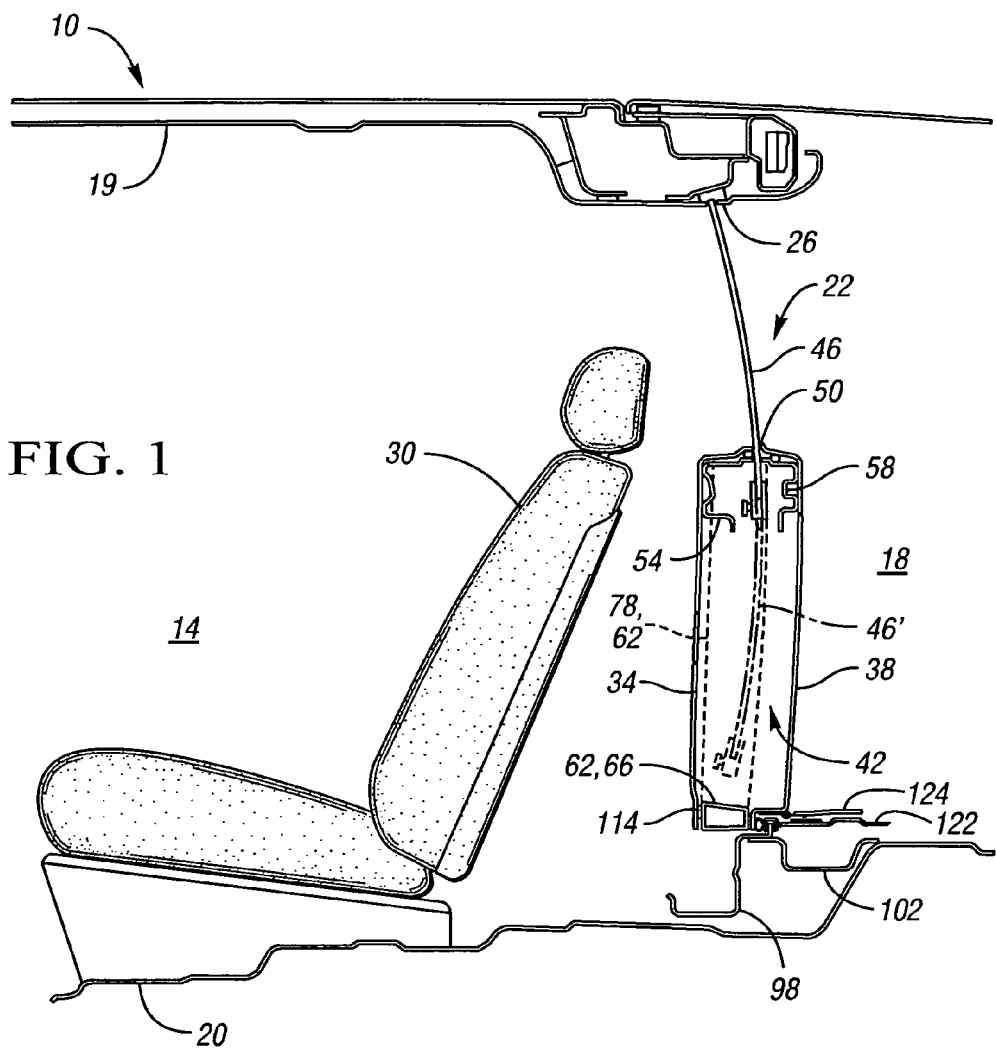

US 7,036,872 B1

VEHICLE MIDGATE

TECHNICAL FIELD

This invention relates to vehicle midgates that include an inner panel, an outer panel, and a tubular, generally U-shaped reinforcement that cooperate to define a cavity.

BACKGROUND OF THE INVENTION

Certain vehicles, such as some sport-utility vehicles and pickup trucks, include a cab portion defining a passenger compartment, and a rear cargo area such as a pickup truck cargo box. A midgate panel assembly is movable between a closed position to obstruct a body opening between the passenger compartment and the rear cargo area, and an open position to connect the passenger compartment and the rear cargo area. When the midgate panel assembly is in the open position, cargo may extend from the rear cargo area into the passenger compartment, increasing the cargo-carrying capacity of the vehicle.

Some midgate panel assemblies include an inner panel and an outer panel that cooperate to form a cavity. A retractable window is selectively movable between a raised position for cooperating with the inner and outer panels to obstruct the body opening, and a retracted position in which the window is substantially entirely within the cavity. An exemplary vehicle with a midgate is described in U.S. Pat. No. 6,513,863, issued Feb. 4, 2003 to Renke et al, which is hereby incorporated by reference in its entirety.

SUMMARY OF THE INVENTION

A midgate panel assembly includes an inner panel and an outer panel that cooperate to partially define a cavity therebetween. A window is at least partially located within the cavity and is configured to selectively protrude outward from an open end of the cavity. A tubular reinforcement member between the inner and outer panels is generally U-shaped and further defines the cavity.

The tubular member is characterized by a closed cross section, and has an inner surface that defines a channel separate from the cavity. The closed cross section of the reinforcement member provides increased midgate panel assembly stiffness. Moreover, the reinforcement member may facilitate water management inside the midgate panel assembly. Water may enter the cavity through the open end if the midgate panel assembly is directly exposed to the vehicle exterior. The reinforcement member is preferably shaped to direct water in the cavity toward an aperture through which the water drains into the rear cargo area and not the passenger compartment. The channel, being separate from the cavity, is not exposed to water that may enter the midgate panel assembly through the open end of the cavity, and thus provides a dry environment for certain hardware components. The tubular reinforcement member is preferably one-piece, thus reducing the number of components in the midgate panel assembly compared to the prior art.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, sectional, side view of a vehicle including a midgate panel assembly;

FIG. 2 is a schematic perspective view of a tubular reinforcement member of the midgate panel assembly of FIG. 1;

DESCRIPTION OF THE PREFERRED EMBODIMENTS

Figure 3:
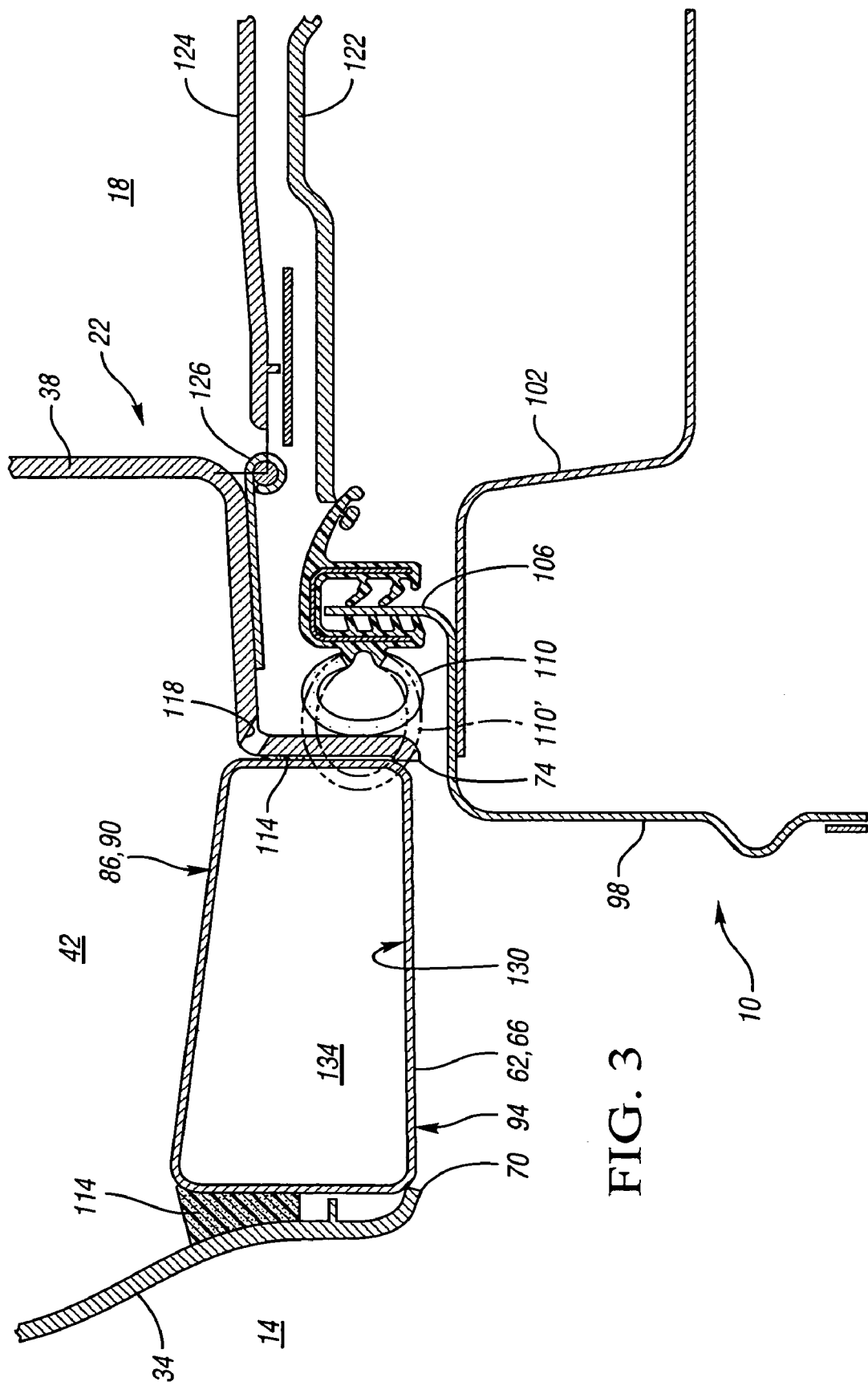
FIG. 3 is a schematic cross sectional view of the lower portion of the midgate panel assembly of FIG. 1 taken along a vertical plane.

Referring to FIG. 1, a vehicle includes a body 10 defining a passenger compartment 14 and a rear cargo compartment 18, i.e., a pickup truck cargo box. The passenger compartment 14 is partially defined by a roof 19 and a floor 20. A midgate panel assembly 22 is selectively pivotable between a closed position, as depicted in FIG. 1, and an open position (not shown). In the closed position, the midgate panel assembly 22 is generally vertically oriented to obstruct a body opening 26 and thereby separate the passenger compartment 14 and the rear cargo compartment 18. In the open position, the midgate panel assembly 22 is generally horizontally oriented so as not to obstruct the body opening 26 so that the passenger compartment 14 and the cargo compartment 18 are connected.

A rear passenger seat 30 in the passenger compartment 14 is removable from the vehicle body 10, or foldable, to facilitate the movement of the midgate panel assembly 22 to the open position. The midgate panel assembly 22 may, within the scope of the claimed invention, be used in various types of vehicles that have a passenger compartment adjacent to a cargo area, such as pickup trucks, sport-utility vehicles, minivans, etc.

The midgate panel assembly 22 includes an inner panel 34 and an outer panel 38 that partially define a cavity 42 therebetween. The inner panel 34 is closer than the outer panel 38 to the passenger compartment 14 when the midgate panel assembly 22 is in the closed position. In the embodiment depicted, the inner panel is an interior trim panel and is comprised of a polymeric material. However, those skilled in the art will recognize a variety of inner panel configurations and materials that may be employed within the scope of the claimed invention. For example, the inner panel 34 may be a stamped sheet of metal upon which an aesthetically-pleasing interior trim panel is mounted.

The midgate panel assembly 22 also includes a glass window 46 that is movable between an extended position and a retracted position. In the extended position, the window 46 protrudes through an open end of the cavity 42, i.e., at slot 50 between the upper edges of the inner panel 34 and the outer panel 38, to cooperate with the inner and outer panels in obstructing opening 26. In the retracted position, the window (shown in phantom at 46') is substantially entirely located within the cavity 42.

The midgate panel assembly 22 also includes an inner belt reinforcement member 54 operatively connected to the inner panel 34 near the slot 50. The midgate panel assembly 22 also includes an outer belt reinforcement member 58 operatively connected to the outer panel 38 near the slot 50. The inner and outer belt reinforcement members 54, 58 are configured to provide structural rigidity to the midgate panel assembly 22.

A tubular reinforcement member 62 is situated between the inner panel 34 and the outer panel 38 and further defines the cavity 42. Referring to FIG. 2, wherein like reference numbers refer to like components from FIG. 1, the tubular reinforcement member 62 is generally U-shaped. More specifically, the tubular reinforcement member 62 includes a first segment 66 that extends along the lower edges of the inner panel and the outer panel, shown at 70 and 74, respectively, in FIG. 3. Second and third segments 78, 82 extend from opposite ends of the first segment 66 and are generally perpendicular to the first segment.

The tubular reinforcement member 62 is one-piece. In a preferred embodiment, the reinforcement member 62 is a hydroformed tube or bent pipe structure. Tube hydroforming is described in U.S. Pat. No. 5,233,854, issued Aug. 10, 1993 to Bowman, et al; and U.S. Pat. No. 5,333,775, issued Aug. 2, 1994 to Bruggemann, et al, both of which are hereby incorporated by reference in their entireties.

Referring to FIG. 3, wherein like reference numbers refer to like components from FIGS. 1 and 2, the first segment 66 of the reinforcement member 62 extends parallel and adjacent to the lower edges 70, 74 of the inner and outer panels 34, 38. The reinforcement member 62 is characterized by an outer surface 86, a portion 90 of which partially defines the lower extent of part of the cavity 42. The body 10 includes stamped structural body panels 98, 102. A flange 106 on structural panel 98 supports a primary seal 110. When the midgate panel assembly 22 is in the open position, the primary seal is in an expanded condition (shown in phantom at 110'). When the midgate panel assembly 22 is in the closed position, as shown in FIG. 3, the outer panel 38 compresses the primary seal 110 to prevent water, dust, etc., from entering the passenger compartment 14 from the rear cargo area 18. Hinges (not shown) for enabling the midgate panel assembly to pivot between the open and closed positions may be attached to the lower portion 94 of the outer surface 86.

Water (not shown) may enter the cavity 42 through the slot (shown at 50 in FIG. 1). Gravity will cause the water to collect at the lower portion of the cavity. Foam 114 prevents water from flowing between the inner panel 34 and the reinforcement member 62 and into the passenger compartment 14. Similary, foam 114 prevents water from flowing between the outer panel 38 and the reinforcement member 62 and into the passenger compartment 14. An aperture 118 in the outer panel 38 at or near the lowest extent of the cavity 42 provides fluid communication between the cavity and the rear cargo compartment 18. The upper portion 90 of the outer surface 86 is inclined when the midgate panel assembly 22 is in the closed position to direct water at the lower portion of the cavity toward the aperture 118.

The aperture 118 is sufficiently located with respect to the primary seal 110 such that the primary seal prevents fluid communication between the aperture 118 and the passenger compartment 14. The seal 110 is configured to direct water from the aperture 118 to the upper surface of the floor 122 of the cargo compartment 18. In the embodiment depicted, the vehicle body includes a flipper panel 124 pivotably connected to the outer panel 38 via hinge 126. The flipper panel 124 creates a false load floor over seal 110 and flange 106 when the midgate panel is in the open position.

The reinforcement member 62 is characterized by a closed cross section. An inner surface 130 defines a channel 134 that is separate from, and not in fluid communication with, the cavity 42.

Figure 4:
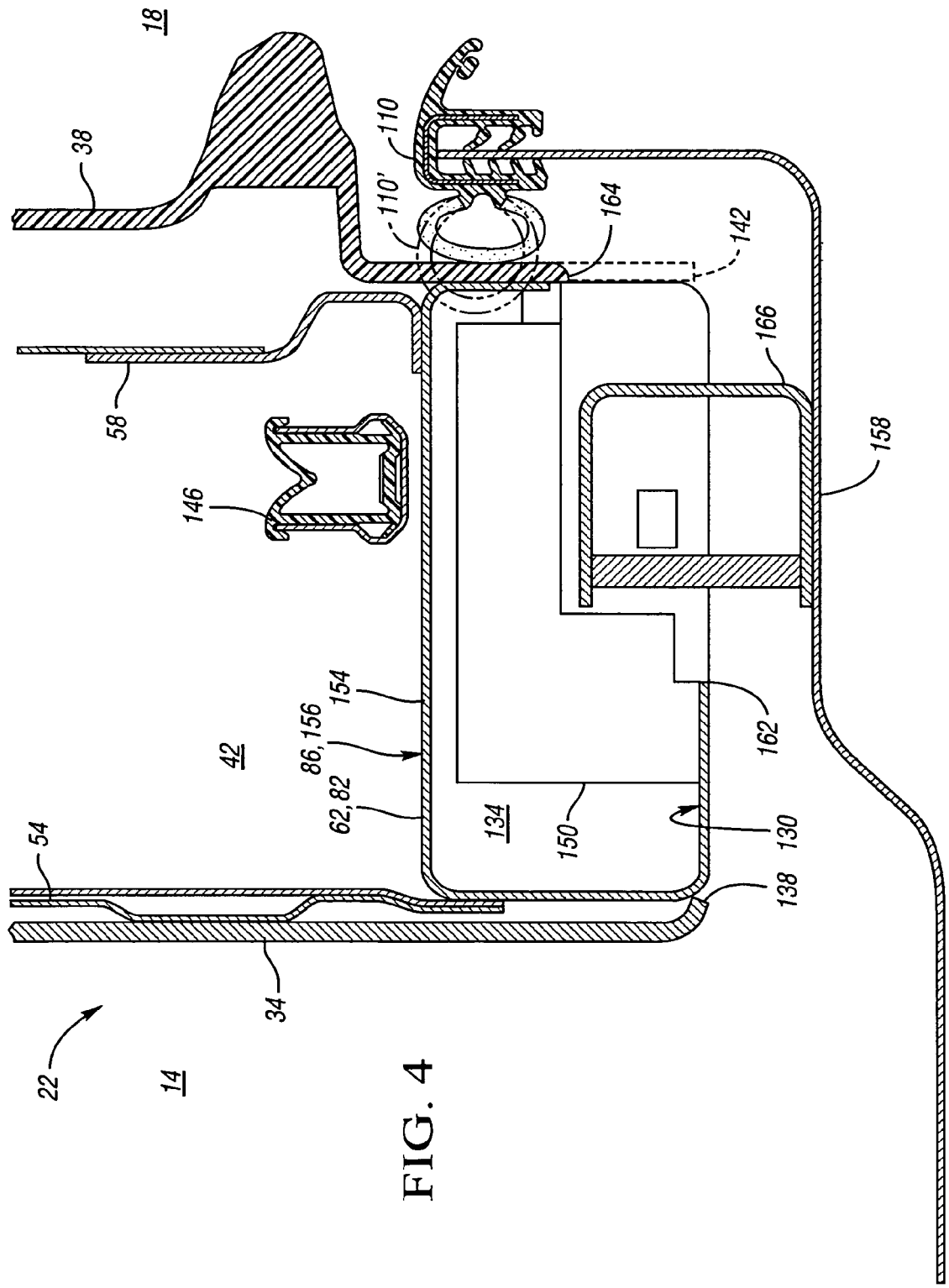
FIG. 4 is a schematic cross sectional view of the lateral portion of the midgate panel assembly of FIG. 1 taken along a horizontal plane.

Referring to FIG. 4, wherein like reference numbers refer to like components from FIGS. 1–3, the third segment 82 of the tubular reinforcement member 62 extends parallel and adjacent to at least a portion of one of the lateral edges 138 of the inner panel 34 and one of the lateral edges 142 of the outer panel 38. The second segment (shown at 78 in FIG. 2) is substantially similar to the third segment 82 and extends along opposite lateral edges of the inner and outer panels 34, 38. The reinforcement member 62 is connected to the inner belt reinforcement member 54 and the outer belt reinforcement member 58. A window run channel 146 guides the window (not shown in FIG. 4). A latch 150 is connected to the third segment of the reinforcement member 62 so as to be at least partially contained within the channel 134 and separated from the cavity 42 by the inner wall 154 of the reinforcement member 62. A portion 156 of the outer surface 86 forms a lateral edge of the cavity 42.

The latch 150 is sufficiently positioned to accept and releasably retain a striker 166 connected to the body structure 158 through a fishmouth aperture 162 formed in the third segment 82. Outer panel 38 includes a notch 164 at the fishmouth aperture 162 so as not to obstruct the path of the striker 166 into the aperture 162. Water cannot enter the cavity 42 via the fishmouth aperture 162 because the wall 154 prevents fluid communication between the cavity 42 and the aperture 162. Referring again to FIG. 2, the second segment 78 of the reinforcement member 62 also defines an aperture 162 through which another latch 170 in the channel receives a striker.

While the best mode for carrying out the invention has been described in detail, those familiar with the art to which this invention relates will recognize various alternative designs and embodiments for practicing the invention within the scope of the appended claims.

What is claimed is:

1. A midgate panel assembly for a vehicle comprising:
   an inner panel;
   an outer panel cooperating with the inner panel to partially define a cavity having an open end;
   a window at least partially located within the cavity and configured to selectively protrude from the cavity through the open end; and
   a tubular reinforcement member further defining the cavity and being generally U-shaped,
   wherein the reinforcement member includes an outer surface that partially defines the cavity and an inner surface that defines a channel; and wherein the midgate panel assembly further comprises a latch at least partially located within the channel.

2. The midgate panel assembly of claim 1, wherein the reinforcement member includes a first segment that forms the lower extent of at least part of the cavity opposite the open end; and second and third segments that form the lateral edges of at least part of the cavity.

3. The midgate panel assembly of claim 2, wherein the reinforcement member is one-piece.

4. The midgate panel assembly of claim 3, wherein the reinforcement member is formed by tube hydroforming.

5. A vehicle comprising:
   a body defining a passenger compartment and a cargo area; and
   a midgate panel assembly comprising an inner panel, an outer panel, and a generally U-shaped reinforcement member having a closed cross section; the inner panel, the outer panel, and the reinforcement member cooperating to define a cavity;

wherein the midgate panel assembly is selectively movable between a closed position to separate the passenger compartment and the cargo area and an open position to connect the passenger compartment and the cargo area, wherein the reinforcement member includes a surface that defines the lower extent of at least a portion of the cavity; and wherein the surface is fluid directingly inclined when the midgate panel assembly is in the closed position.

6. The vehicle of claim 5, wherein midgate panel assembly defines an aperture through which the cavity and the inclined surface are in fluid communication with the cargo area when the midgate panel assembly is in the closed position.

7. The vehicle of claim 5, wherein the reinforcement member includes a generally horizontal segment and two generally vertical segments extending from opposite ends of the horizontal segment; wherein the reinforcement member has an inner surface that defines a channel; and wherein the midgate panel assembly further includes at least one latch located in the channel at one of the two generally vertical segments.

8. A vehicle comprising:

a body defining a passenger compartment and a cargo area;

a midgate panel assembly being selectively movable between a closed position to separate the passenger compartment and the cargo area and an open position to connect the passenger compartment and the cargo area, the midgate panel assembly having an outer panel, an inner panel, and a tubular reinforcement member cooperating with the inner panel and the outer panel to at least partially define a cavity;

the reinforcement member having an inner surface defining a channel and being characterized by a first segment and second and third segments extending perpendicularly from opposite ends of the first segment;

the first segment defining a surface that forms the lower extent of at least part of the cavity when the midgate panel assembly is in the closed position;

the midgate panel assembly defining an aperture;

the surface being sufficiently inclined to direct fluid to the aperture; and a latch located at least partially in the channel at the second or third segment.

* * * * *